Figure 1:
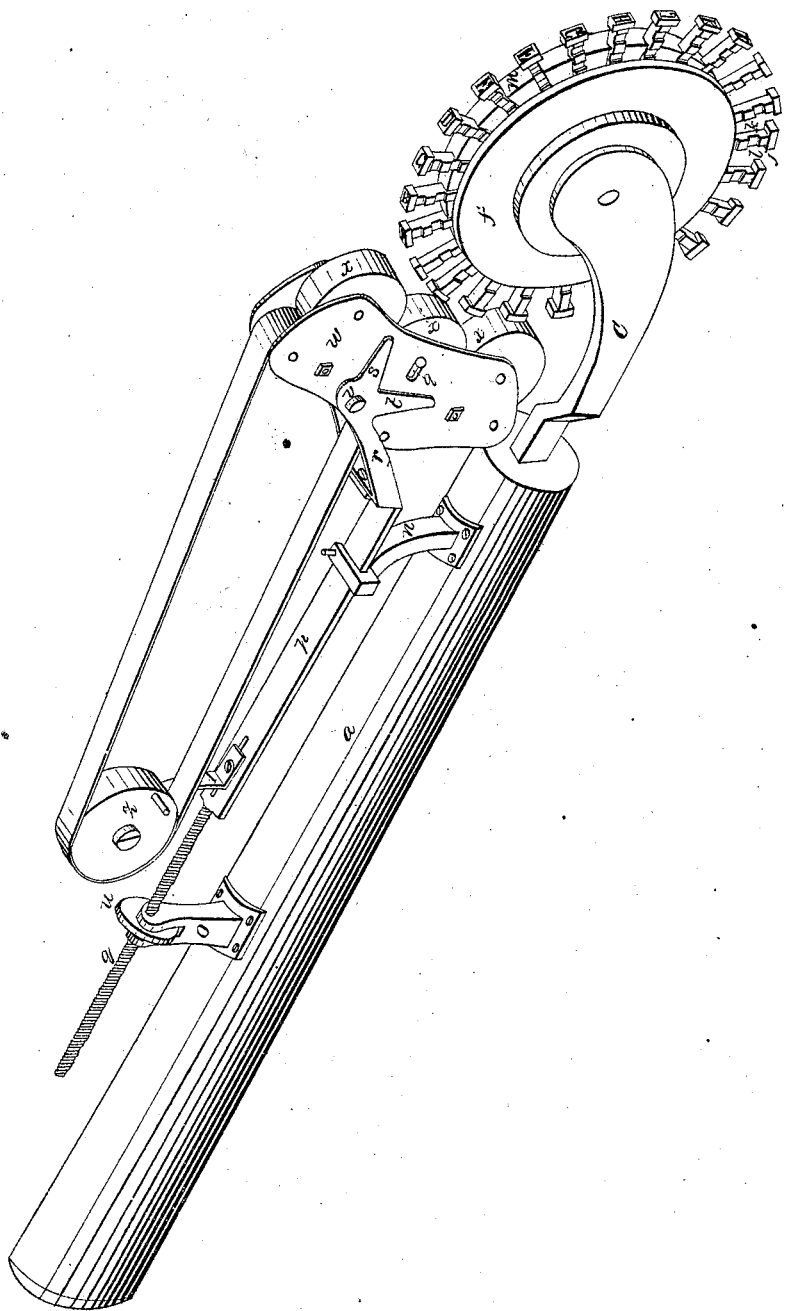

E. Crawley.
Index Letterer.
N° 15283. Patented Jul. 8. 1850.

E. Crawley.
Index Letterer.
Nº 15,283. Patented Jul. 8, 1856.
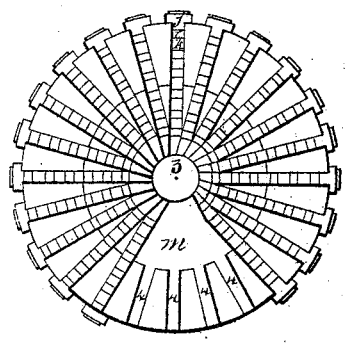
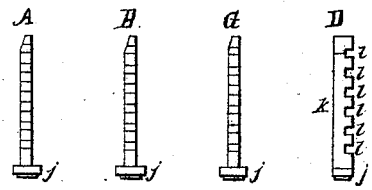
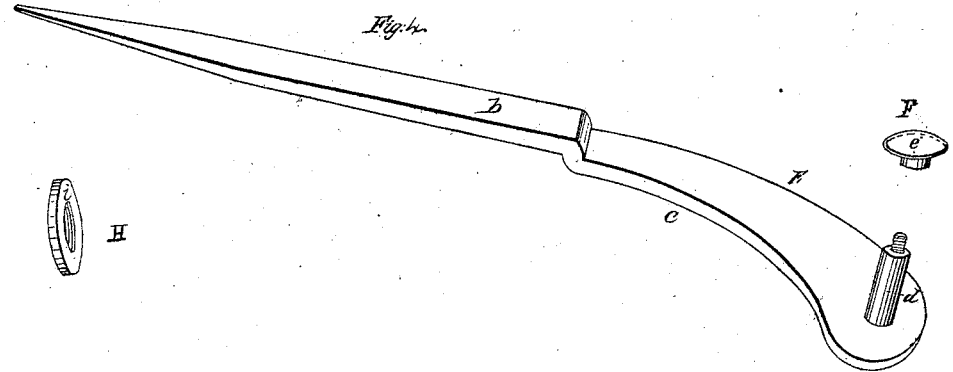
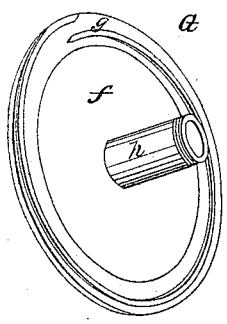
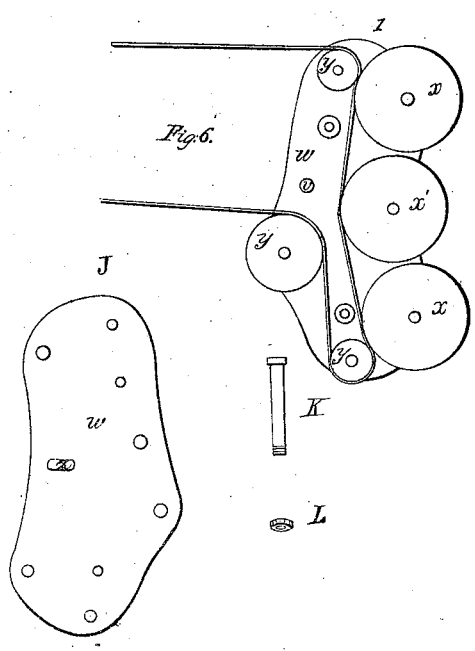

UNITED STATES PATENT OFFICE.

EDWIN CRAWLEY, OF CINCINNATI, OHIO.

TOOL FOR INDEX-LETTERING.

Specification of Letters Patent No. 15,283, dated July 8, 1856.

*To all whom it may concern:*

Be it known that I, EDWIN CRAWLEY, of Cincinnati, Hamilton county, Ohio, have invented a new and useful Tool for Index-Lettering; and I do hereby declare the following to be a full, clear, and exact description thereof, reference being had to the annexed drawings, making part of this specification.

My invention is contrived to expedite the lettering of indexes in blank and other books, and consists, firstly, of an arrangement in a circular revolving head of a series of types capable of simultaneous expansion or contraction so as to print an index of any desired "display" with a single rapid continuous movement; secondly, an automatic inking apparatus capable of adaptation to the varying expanded and contracted conditions of the head.

In the accompanying drawings Figure 1 is a perspective view of the tool in condition for use. Fig. 2 exhibits the interior face of the type holding plate. Fig. 3, A B C D are detached views of type. Fig. 4, E is a perspective view of the stem and pivot. F the confining nut. Fig. 5, G is a perspective view of the expanding or adjusting plate; H, a pinching nut for fixing and securing the series of types to any given adjustment. Fig. 6, I is a longitudinal elevation of my inking rollers, one plate (J) being removed; K, bolt; and L, nut for securing the same.

In a handle (*a*) such as usually employed by bookbinders there is inserted the shank (*b*) of a stem (*c*) from which stem there projects rectangularly a pivot (*d*) screw threaded at the end to receive a nut (*e*).

(*f*) is a circular plate having projecting from one of its disks a spiral flange or head (*g*). Projecting rectangularly from the center of this plate is a cylindrical hub or arbor (*h*), screw threaded externally at its end for a nut (*i*), which nut is employed to clamp firmly together the two disks after an adjustment of the type, of which (*j*) is the head; (*k*), the shank, of rectangular form and having transverse grooves (*l*) to receive the spiral flange (*g*) by which—the plate (*f*) being rotated—the whole set of types are run out and in simultaneously.

(*m*) is an annular plate having at its center a circular aperture 3 nicely fitting the arbor (*h*). Its inner disk is grooved radially as represented at (4) to receive the shanks (*k*) of the types which are thereby held firmly from any other movement than the radial one received from the flange (*g*).

The inking apparatus is formed as follows: (*n*) (*o*) are two standards extending upward from the handle; these standards support a sliding bar (*p q r s t*) which I call the "bearing bar." The middle portion (*p*) of this bar is of the represented flattened rectangular form, its rear extremity consisting of a screw (*q*) bearing a nut (*u*) confined between the represented jaws of the standards (*o*). So that by turning the nut, the bar is drawn back and fro in the standards. The forward portion of the bearing bar has a branched or stirrup like form, each jaw or plate (*r*) being extended forward and downward in the form of fingers (*s t*) or otherwise. (*v*) is a pivot passing through these jaws (*r*); on this pivot is suspended the case (*w*), containing at its front portion the inking rollers (*x x x′*), and behind them several pulleys (*y*), around which the inking or distributing band being wound, is stretched around a driving pulley (*z*) pivoted to a bearing (1) attached (adjustably or otherwise) to the bearing bar.

The described arrangement of branching-jaws and pivot, hold the inking head firmly against any vibration but one at right angles to the pivot. Two or more inking rollers may be employed; where three (as in the present illustration) are used the middle one (*x′*) pivots in a slot (2) permitting self adaptation of the roller to the greater or less arc presented by the extensible type head. By the represented arrangement the distributing band is brought to bear against the peripheries of the inking rollers on their rear sides.

I claim as new and of my invention—

1. The arrangement substantially as described of a circular revolving head, having around its periphery a series of types adjustable radially so as to print an index of greater or less "display" by a single rapid continuous movement; using for such purpose the described pair of disks of which one has radial grooves, holding a set of types, notched transversely to receive the spiral flange on the other disk, in combination with the securing and tightening nuts upon the arbor and pivot as described or devices substantially equivalent.

2. I claim in this connection, the inking apparatus having two or more inking rollers, and the described distributing mechanism in a vibrating head, attached and supported substantially as described to a sliding bar, or equivalent devices for the purposes explained.

In testimony whereof, I hereunto set my hand before two subscribing witnesses.

EDWIN CRAWLEY.

Witnesses:
 GEO. H. KNIGHT,
 JAS. H. GRATZ.